Figure 1:
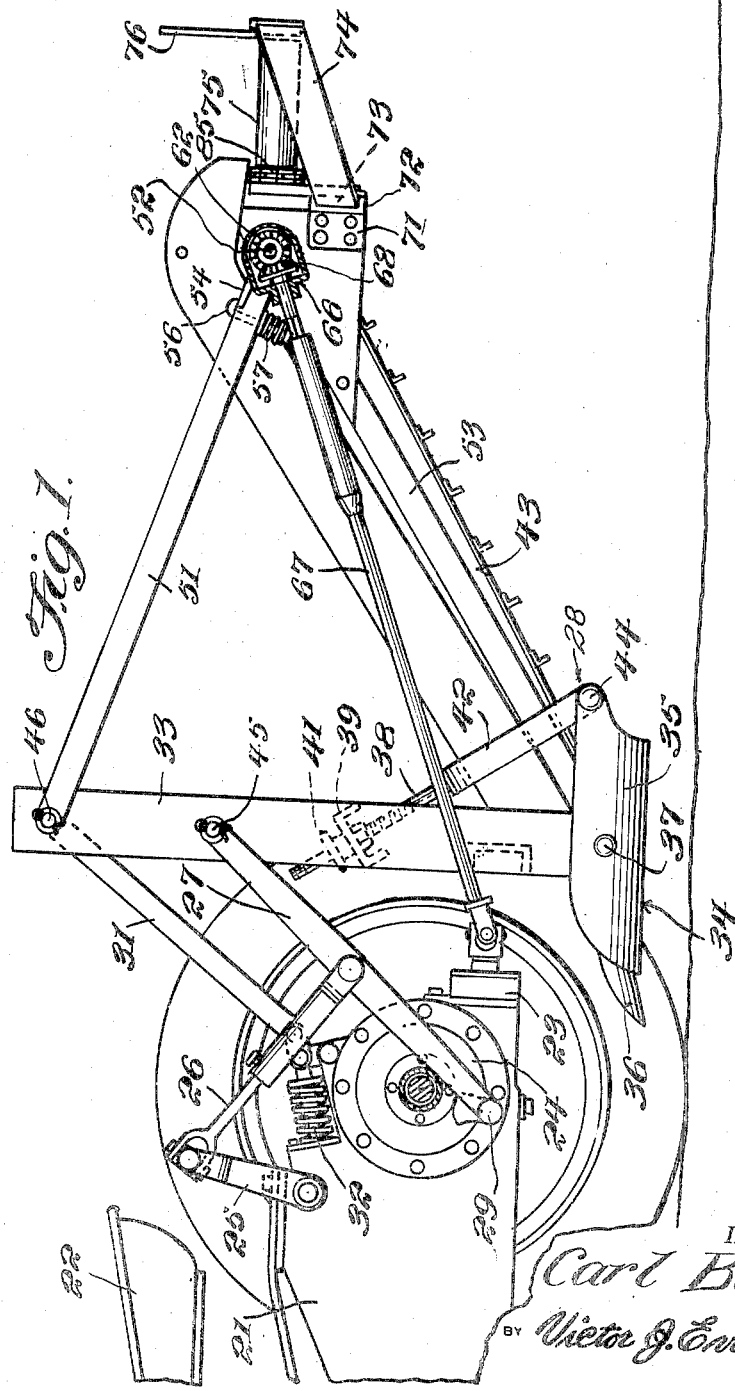

March 23, 1954

C. BLOCKER 2,672,701

DIGGING ADJUSTMENT FOR DITCHING
PLOW AND CONVEYER COMBINATION

Filed July 16, 1947

6 Sheets-Sheet 1

INVENTOR.
Carl Blocker,
BY Victor J. Evans & Co.
ATTORNEYS

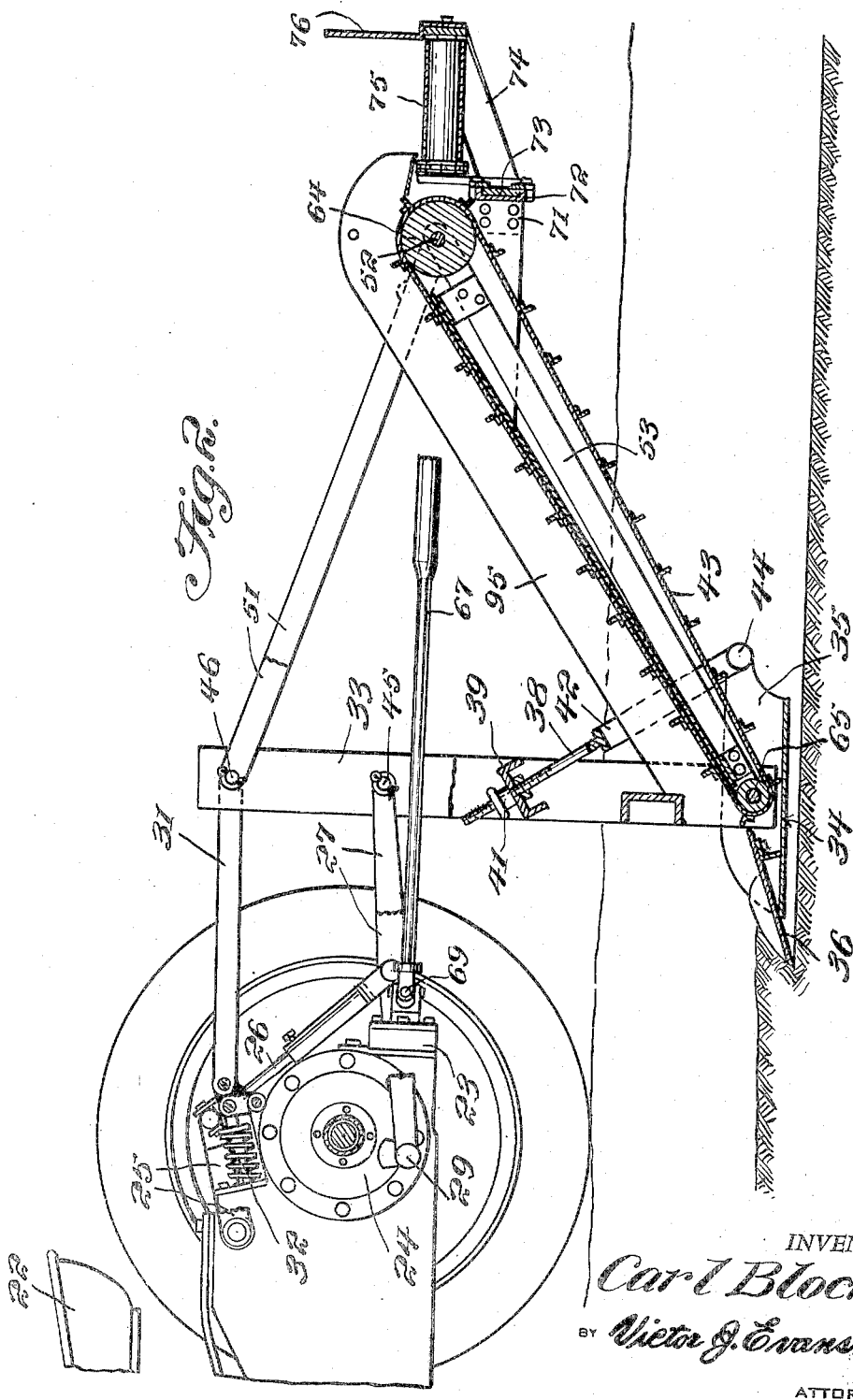

March 23, 1954
C. BLOCKER
2,672,701
DIGGING ADJUSTMENT FOR DITCHING
PLOW AND CONVEYER COMBINATION
Filed July 16, 1947
6 Sheets-Sheet 3
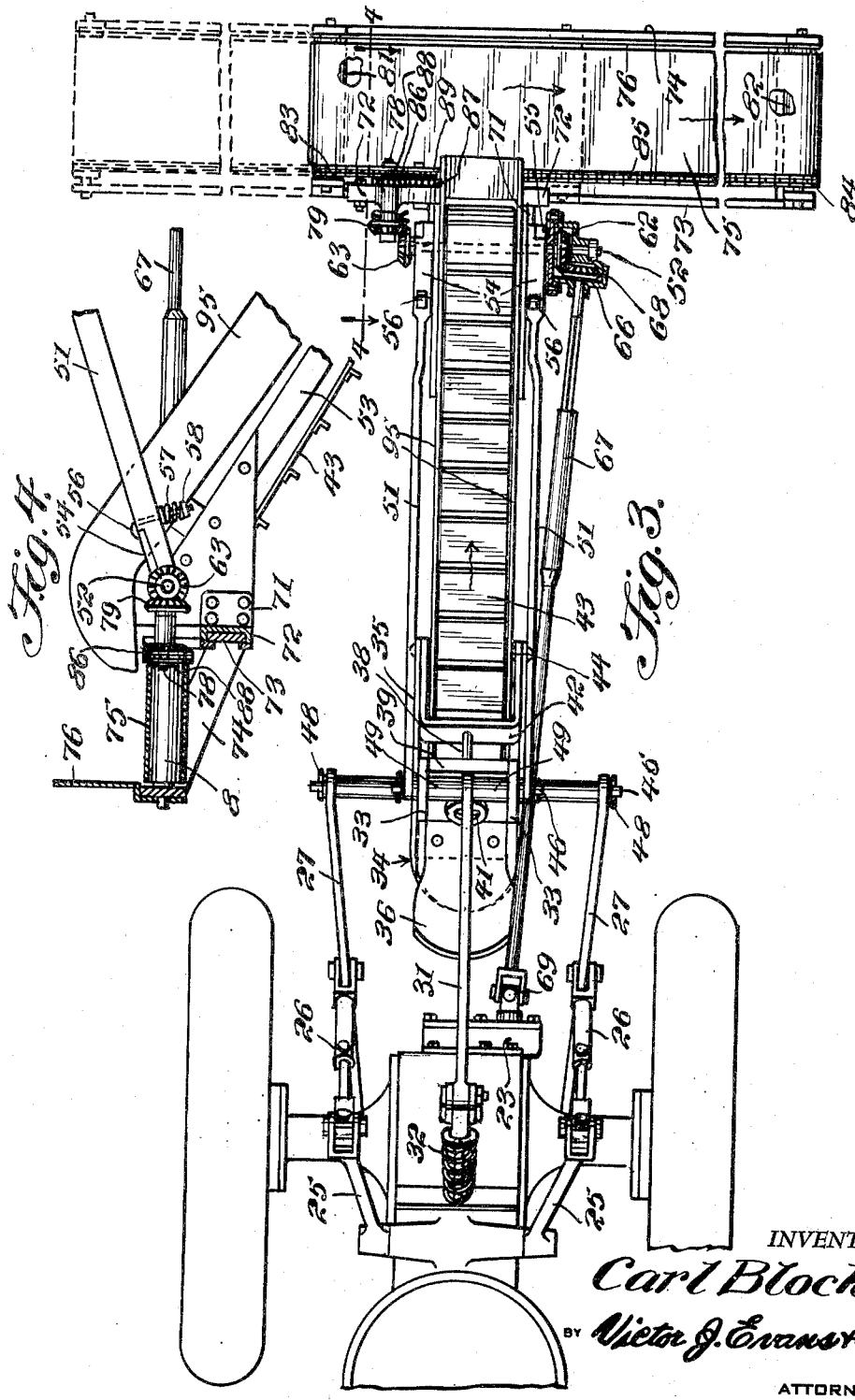
INVENTOR.
Carl Blocker,
BY Victor J. Evans & Co.
ATTORNEYS

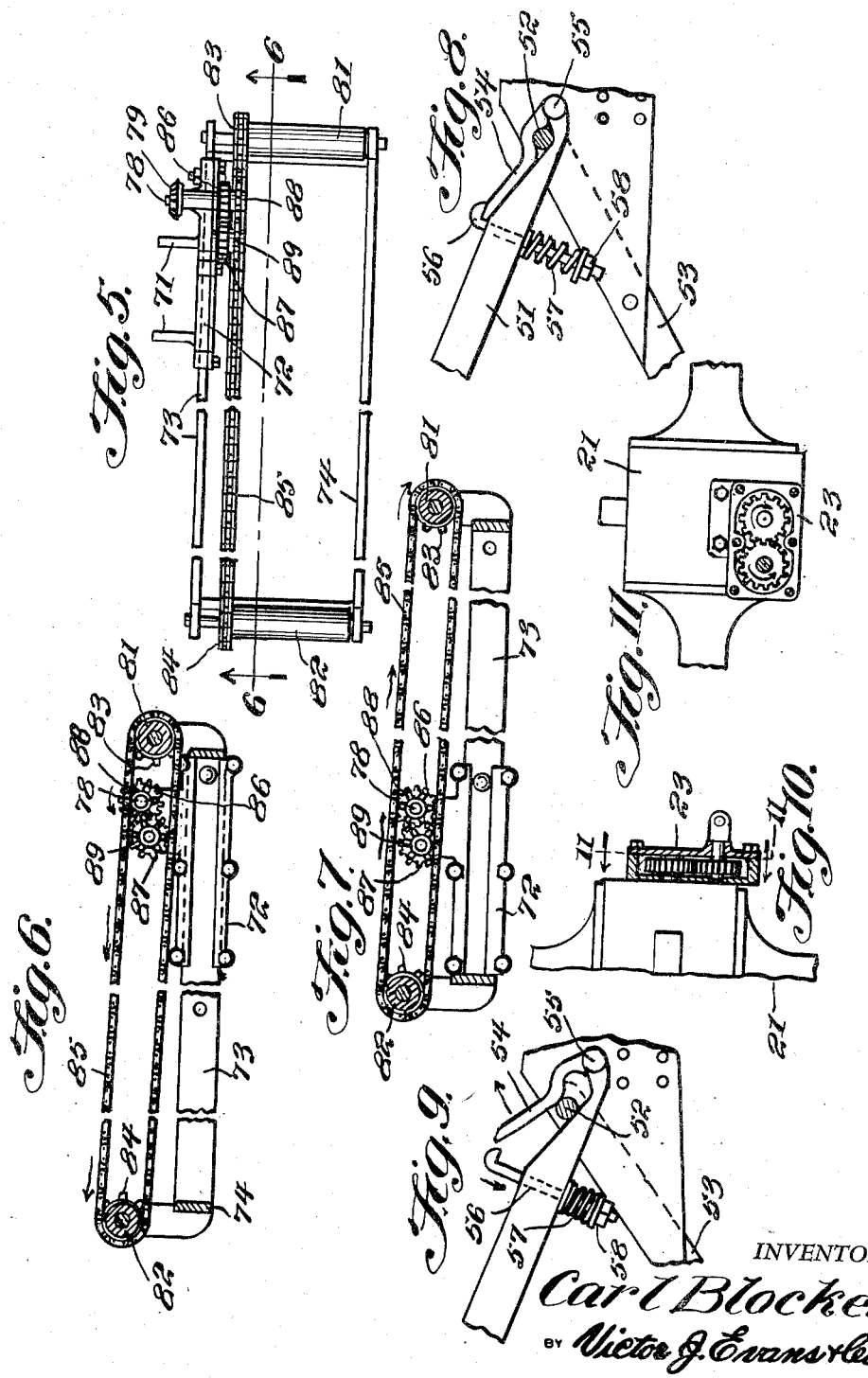

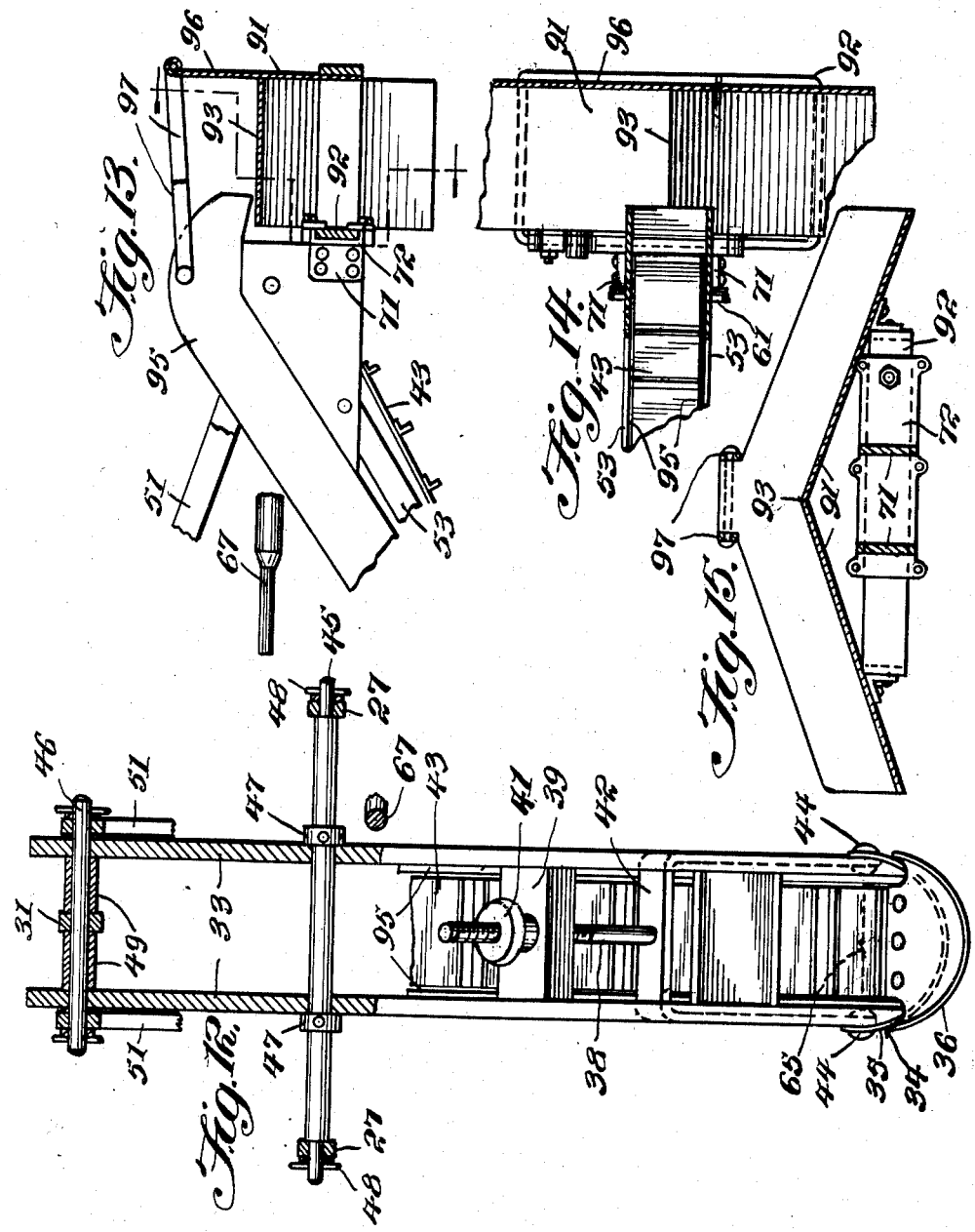

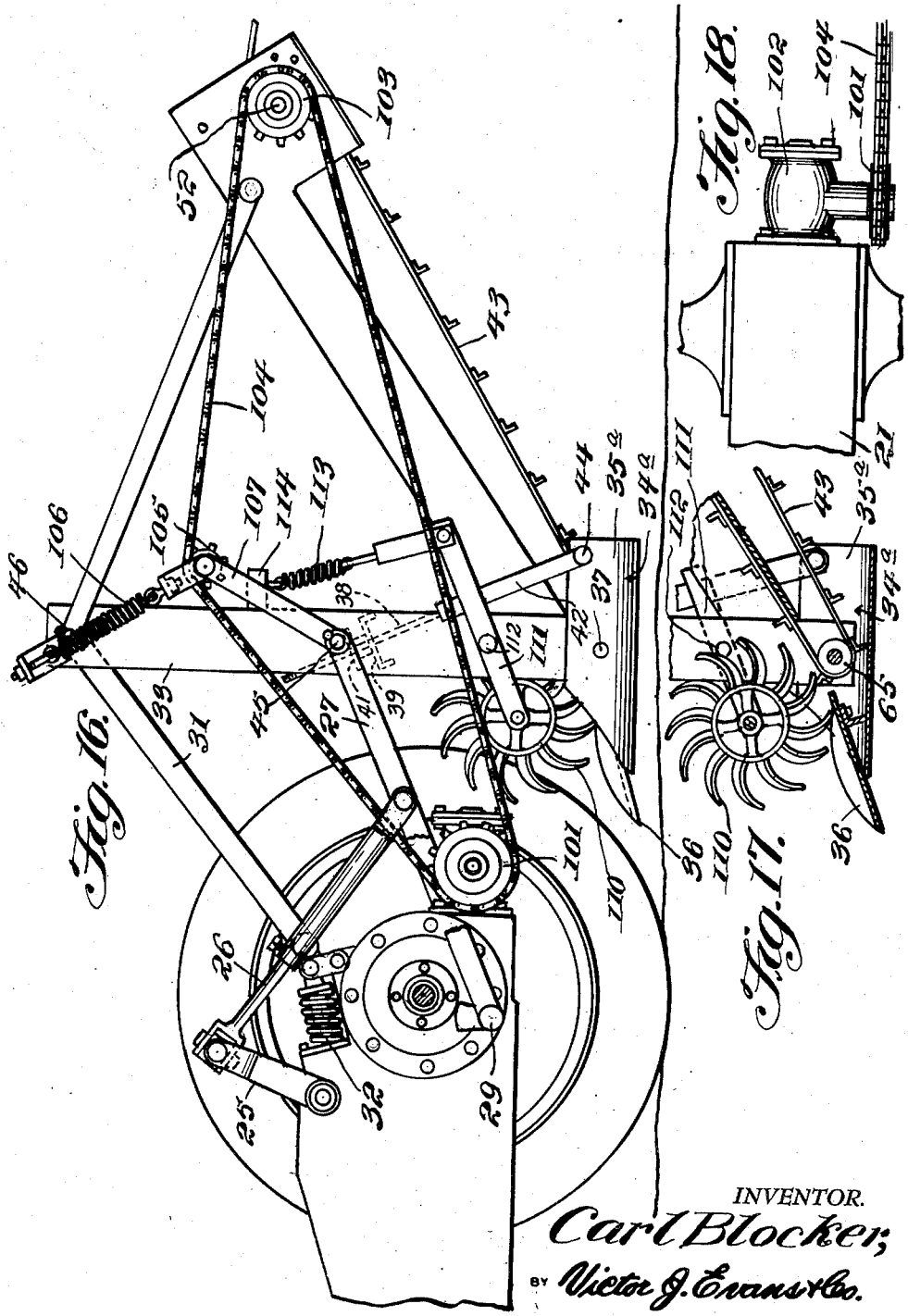

Patented Mar. 23, 1954

2,672,701

UNITED STATES PATENT OFFICE 2,672,701

DIGGING ADJUSTMENT FOR DITCHING PLOW AND CONVEYER COMBINATION

Carl Blocker, Midland, Ohio

Application July 16, 1947, Serial No. 761,250

2 Claims. (Cl. 37—102)

1

This invention relates to a ditch digger particularly adapted for digging ditches into which tile may be disposed.

It is an object of the present invention to provide a tile ditch digger which is adapted to be mounted upon the rear of a tractor so as to be adjustable between positions of transport and work or ground travel and which, in the ground engaging position, will cause the dirt to be elevated to a transversely extending conveyor, whereby the dirt will be deposited on both sides of the ditch or may be deposited on only one side of the same, and wherein the operable devices of the tractor can be utilized for operating the ditch digger as for instance to lift the same and to operate the conveyors.

Other objects of the present invention are to provide a tractor mounted tile ditch digger which is of simple construction, inexpensive to manufacture, and efficient in operation.

For a better understanding of the invention, reference may be had to the following detailed construction taken in connection with the accompanying drawing, in which Fig. 1 is a side elevational view of the ditch digger mounted on a tractor and elevated to a raised position, Fig. 2 is a side elevational view wherein the ditch digger has been extended to its lowered position wherein dirt will be elevated and discharged to the sides of the ditch, Fig. 3 is a top plan view of a ditch digger, Fig. 4 is a cross-sectional view taken on line 4—4 of Fig. 3, Fig. 5 is a top plan view of one of the side delivery conveyors, Fig. 6 is a cross-sectional view taken on line 6—6 of Fig. 5, Fig. 7 is a longitudinal cross-sectional view taken through the side delivery conveyor with the same adjusted upon its support to deliver the dirt at the opposite side from which it would deliver the dirt when arranged as in Fig. 3, Fig. 8 is a fragmentary side elevational view of a clamp device for connecting a brace to the upper end of the elevating conveyor, Fig. 9 is a similar view to that shown in Fig. 8 wherein the clamp is about to release its connection with the pin projection on the upper end of the conveyor, Fig. 10 is a top plan view of the rear end of a tractor, or fragmental portion thereof, and showing the power take-off attachment, Fig. 11 is a rear elevational view of a portion of the rear axle housing of the tractor and look-

2 ing upon the power take-off, the view taken on line 11—11 of Fig. 10,

Fig. 12 is a front elevational view of the ditch digger with portions broken away to show the connections of the parallel lifting links which attach the digger to the rear of the tractor, Fig. 13 is a fragmentary and cross-sectional view of the upper end of the ditch digger utilizing a modified form of side delivery conveyor in the nature of a chute which will deliver the dirt to both sides of the ditch, Fig. 14 is a fragmentary top plan view of the arrangement shown in Fig. 13, Fig. 15 is a cross-sectional view of the double chute taken on line 15—15 of Fig. 13, Fig. 16 is a side elevational view of a modified form of ditch digger wherein a different drive mechanism is utilized for connecting the conveyor drives with the power take-off of the tractor, Fig. 17 is a fragmentary sectional view similar to Fig. 16 taken on the longitudinal center of the lower end of the ditch digger and showing in full the feed wheel, Fig. 18 is a top plan view of a fragment of the rear axle housing and of the power take-off device for the chain drive of Fig. 16.

Referring now to the figures, 21 represents a tractor having an operator's station 22. On the rear end of this tractor is a power take-off attachment 23 adapted to be operated from the tractor. At the top of the rear axle housing are power lifting arms 25 which are connected by lifting rods 26 with links 27 used for coupling the ditch digger as indicated generally at 28 to the rear of the tractor. The links 27 are pivoted upon the tractor as indicated at 29. Above the links 27 is a parallel link 31 which is pivoted upon the tractor through a power control device 32. The rear ends of the links 27 and 31 are connected to a vertically-extending beam formed of two parts both of which are indicated by the numeral 33 to the lower ends of which is connected a plow or digging shovel 34. This shovel includes a main part 35 and a shovel point or plow 36, Fig. 2, and is pivotally connected with the lower ends of the beams 33 as indicated at 37. The entrance angle of the point 36 can be controlled by a rod 38 extending through a bracket 39 fixed between the beams 33. An adjusting nut 41 is disposed on the rod 38 and serves as a stop to limit the upward movement of the shovel point 36. A bifurcated portion 42 is provided on the rod 38 and extends about conveyor 43 for connection with the rear end of main part 35 as indicated at 44.

As seen more clearly in Fig. 12, the connections of the links 27 and 31 to the beams 33 are effected through transversely extending shafts 45 and 46. The shaft 45 is retained against axial displacement within the beam parts 33 by collars 47. The links are made secure on the ends of the shaft by cotter pins 48.

Spacer sleeves 49 are provided on shaft 46 to hold the beam parts in the proper spaced relationship relative to one another at the upper ends. The single link 31 is disposed between the sleeves 49. Extending rearwardly from the outer ends of the shaft 46 are rearwardly extending links 51. As viewed in Figs. 8 and 9 the rear ends of these links 51 have means whereby the links can be releasably connected to a drive shaft 52 on the upper end of a supporting frame 53 for the conveyor 43. On each link 51 there is provided a catch or arm 54, shaped to be extended about the shaft 52 and pivoted at the end of the link 51 as indicated at 55. This member 54 is retained in locked position over the shaft 52 by a spring catch 56 extending through the link 51 and urged downwardly toward the member 54 by a spring 57 reacting upon a nut 58 on the catch shank. Upon compressing the spring 57 the member 54 may be released so as to be swung to an open position as shown in Fig. 9 whereby to release the supporting frame 53 and permit the conveyors to be lowered to a ground position whereby the same will be more accessible to be repaired.

The transverse drive shaft 52 has bevel gears 62 and 63 upon its opposite ends. On this shaft 52 is a driving pulley 64 for the conveyor 43. The lower end of this conveyor 43 is supported upon an idler pulley 65. A housing 66 is pivoted on shaft 52 and supports the upper end of a telescopic drive shaft 67 and a driving gear 68 meshing with the gear 62. The lower end of the shaft 67 is coupled by a universal joint 69 with the power take-off device 23 on the tractor. The angle of shaft 67 may change as the digger is adjusted.

Extending rearwardly from the upper end of frame 53 is a bracket 71 with a guide formation 72 therein in which a slide 73 can be laterally adjusted. The slide 73 is formed on a frame 74 which supports a transversely extending conveyor belt 75 for delivering dirt to the side of the ditch depending upon the side to which it is extended. A back plate 76 prevents the dirt from falling back into the ditch. Extending rearwardly through the bracket 71 is a shaft 78 having a bevel gear 79 thereon meshing with the bevel gear 63 of the shaft 52.

The conveyor 75 is extended between two pulleys 81 and 82. Extending from these pulleys are sprockets 83 and 84 respectively over which are extended chain links 85. Shaft 78 has a gear 86 meshing with a gear 87. Shaft 78 also has a sprocket 88 for driving the chain 85 in one direction. The gear 87 is connected to a sprocket 89 and will drive the chain 85 in the opposite direction. When the conveyor 75 is extended to one side of the ditch, one sprocket is used for driving the conveyor whereas when the same is extended to the opposite side of the ditch as illustrated in dotted lines the other sprocket is used to drive the conveyor in the proper direction.

Referring now particularly to Figs. 13, 14 and 15, a chute 91 is provided and has a slide 92 adapted to be connected into the formation 72 on the bracket 71. The chute is raised at the center as indicated at 93 and has its sides extending downwardly in opposite directions to deposit dirt at the opposite sides of the ditch. Inasmuch as the conveyor 75 can be easily and simply removed from the bracket 71, little difficulty is had in mounting the chute 91 on the bracket 71 instead of the belt conveyor 75. When the chute is used, there is no need for the driving connections. Extending along the sides of conveyor 43 are shields 95 to prevent the dirt from leaving the sides thereof. On the chute 91 there is a shield extension 96 which will be braced by links 97 connecting the same with the upper ends of the shield 95.

Referring now to Figs. 16, 17 and 18, there is shown a modified form of drive for the conveyors. Instead of having a shaft 67, a power take-off is provided which has a sprocket 101 extending to one side of a power take-off housing 102. On shaft 52 there is provided a sprocket 103. A chain 104 is extended between the sprockets 101 and 103. A chain tightening sprocket 105 is extended downwardly from the upper end of beam 33 by a tension spring 106 which draws the chain upwardly. The sprocket 105 is journalled on the upper end of an arm 107 pivoted upon the rod 45.

A feed wheel 110 is journalled on the lower end of a lever 111 pivoted as indicated at 112 to the beams 33. This wheel is located over the shovel 34a which has a main part 35a and the wheel is urged downwardly by a tension spring 113 connected between the rear end of the lever 111 and a bracket 114 on the beams 33.

While various changes may be made in the detailed construction it shall be understood that such changes shall be within the spirit and scope of the present invention as defined by the appended claims.

I claim:

1. In a ditch digger structure, the combination which comprises a pair of spaced vertically disposed parallel beams, a transversely disposed shaft extended through the lower ends of the beams, a shovel, substantially semi - circular shaped in cross section having upwardly extended side walls and having a plow carried by the forward end positioned over the lower ends of the beams and pivotally mounted through the said upwardly extended side walls on the ends of the said shaft, a bracket mounted in and connecting the said beams, a supporting rod adjustably connecting the rear end of the shovel to the said bracket for adjusting the position of the said plow, an inclined conveyor mounted on the said transverse shaft and extended rearwardly from the said beams, links connecting the extended end of the conveyor to the upper ends of the said vertically disposed beams, means mounting the said vertically disposed beams on a tractor, means mounted on the tractor and connected to said vertically disposed beams for raising and lowering said vertically disposed beams for adjusting the elevation of the shovel and plow, and means driving the said conveyor from a tractor upon which the beams are mounted.

2. In a ditch digger structure, the combination which comprises a pair of spaced vertically disposed parallel beams, a transversely disposed shaft extended through the lower ends of the beams, a shovel, substantially semi - circular shaped in cross section having upwardly extended side walls and having a plow carried by the forward end positioned over the lower ends of the beams and pivotally mounted through the said upwardly extended side walls on the ends of the said shaft, a bracket mounted in and connecting the said beams, a supporting rod adjustably connecting the rear end of the shovel to the said bracket for adjusting the position of the said plow, a substantially horizontally disposed lever positioned between the vertically disposed beams and pivotally mounted in said beams, a feed wheel having arcuate outwardly extended teeth journaled in one end of said lever and positioned over said shovel, and a spring connecting the opposite end of the said lever to the upper part of one of the said vertically disposed beams, an inclined conveyor mounted on the said transverse shaft and extended rearwardly from the said beams, links connecting the extended end of the conveyor to the upper ends of the said vertically disposed beams, means mounting the said vertically disposed beams on a tractor, means mounted on the tractor and connected to said vertically disposed beams for raising and lowering said vertically disposed beams for adjusting the elevation of the shovel and plow, and means driving the said conveyor from a tractor upon which the beams are mounted.

CARL BLOCKER.

References Cited in the file of this patent

UNITED STATES PATENTS

| Number | Name | Date |
|---|---|---|
| 198,983 | Humphreys | Jan. 8, 1878 |
| 312,049 | Welch | Feb. 10, 1885 |
| 871,011 | Warne | Nov. 12, 1907 |
| 1,182,779 | Lee | May 9, 1916 |
| 1,229,116 | Metzler et al. | June 5, 1917 |
| 1,988,254 | Smith | Jan. 15, 1935 |
| 2,295,850 | King | Sept. 15, 1942 |

FOREIGN PATENTS

| Number | Country | Date |
|---|---|---|
| 377,954 | Germany | June 30, 1923 |